United States Patent
Lai et al.

(10) Patent No.: US 8,778,439 B2
(45) Date of Patent: Jul. 15, 2014

(54) METHOD OF MAKING NUTRITIONAL EMULSIONS CONTAINING PROCESS-ENCAPSULATED OILS

(75) Inventors: Chron-Si Lai, Blacklick, OH (US); Joseph E. Walton, Westerville, OH (US); Charles R. Helmke, Gahanna, OH (US); Kati E. Shearer, Terre Haute, IN (US)

(73) Assignee: Abbott Laboratories, Abbott Park, IL (US)

( * ) Notice: Subject to any disclaimer, the term of this patent is extended or adjusted under 35 U.S.C. 154(b) by 75 days.

(21) Appl. No.: 13/698,536

(22) PCT Filed: May 17, 2011

(86) PCT No.: PCT/US2011/036761
§ 371 (c)(1),
(2), (4) Date: Jan. 22, 2013

(87) PCT Pub. No.: WO2011/146444
PCT Pub. Date: Nov. 24, 2011

(65) Prior Publication Data
US 2013/0115355 A1    May 9, 2013

Related U.S. Application Data

(60) Provisional application No. 61/345,353, filed on May 17, 2010.

(51) Int. Cl.
*A23D 7/02* (2006.01)
(52) U.S. Cl.
USPC .............................. 426/602; 426/613; 426/519
(58) Field of Classification Search
USPC .......................................... 426/602, 613, 519
See application file for complete search history.

(56) References Cited

U.S. PATENT DOCUMENTS

| | | | | |
|---|---|---|---|---|
| 4,913,921 | A | * | 4/1990 | Schroeder et al. ............. 426/321 |
| 4,963,380 | A | * | 10/1990 | Schroeder et al. ......... 426/330.3 |
| 5,882,713 | A | * | 3/1999 | Eskins et al. ................... 426/578 |
| 2008/0058418 | A1 | * | 3/2008 | D'Angelo et al. ............. 514/560 |
| 2009/0162494 | A1 | * | 6/2009 | Lai ................................... 426/87 |
| 2009/0162517 | A1 | * | 6/2009 | Lai et al. ........................ 426/580 |
| 2011/0039002 | A1 | * | 2/2011 | Verkoeijen et al. ............ 426/541 |

FOREIGN PATENT DOCUMENTS

| | | |
|---|---|---|
| WO | 2006113819 | 10/2006 |
| WO | 2007060177 | 5/2007 |
| WO | 2008155696 | 12/2008 |
| WO | 2009018144 | 2/2009 |
| WO | 2009086054 | 7/2009 |

OTHER PUBLICATIONS

Swern, D. 1979. Bailey's Industrial Oil and Fat Products, vol. 1, 4$^{th}$ edition. John Wiley & Sons, New York. p. 194-195.*
Office Action in CN 201180024823.2 dated Aug. 21, 2013 (received Aug. 30, 2013).
Communication in EP Application No. 11721939.4 dated Sep. 26, 2013.
First Office Action in CN 201180024755.x (PCT/US2011/036761) dated Aug. 26, 2013 (received Sep. 25, 2013).
Intention to Grant in EP Application No. 11721940.2 dated Oct. 4, 2013.
2nd Office Action in CN 201180024823.2 dated Jan. 15, 2014 (received Jan. 20, 2014).
Haahr, et al, "Emulsifer Type, Metal Chelation and PH Affect Oxidative Stability of N-3-Enriched Emulsions,"Eur. J. Lipid Sci. Technol., vol. 110, 2008, pp. 949-961.
PCT/US11/36761 International Search Report and Written Opinion mailed Aug. 5, 2011.
PCT/US11/36761 International Search Report mailed Aug. 5, 2011.
PCT/US11/36761 International Preliminary Report on Patentability mailed Nov. 20, 2012.
PCT/US11/36760 International Search Report and Written Opinion mailed Aug. 5, 2011.
PCT/US11/36760 International Search Report mailed Aug. 5, 2011.
PCT/US11/36760 International Preliminary Report on Patentability mailed Aug. 24, 2012.
PCT/US11/36760 Chapter II Demand and Response to Written Opinion, mailed Mar. 16, 2012.

* cited by examiner

*Primary Examiner* — Carolyn Paden
(74) *Attorney, Agent, or Firm* — Calfee, Halter & Griswold LLP

(57) ABSTRACT

Disclosed is a method of making nutritional emulsions, comprising: (A) heating and blending together an emulsifying agent having a melt point above about 25 C and oil having hydrophobic off-notes (e.g. non-encapsulated polyunsaturated fatty acid) in a weight ratio of at least about 1:15; (B) adding the heated blend to a fat, protein, and carbohydrate mixture comprising a maltodextrin (DE of about 10 or less), in a weight ratio of the maltodextrin to the oil having hydrophobic off-notes of at least about 1:2; and (C) homogenizing, and then cooling the combination below the melt point of the emulsifying agent to form a nutritional emulsion comprising from about 0.01% to about 5% by weight of process-encapsulated polyunsaturated fatty acid. The resulting nutritional emulsions effectively mask off-notes commonly associated with certain oils, e.g., polyunsaturated fatty acids, soy oil, beta-hydroxy-beta-methylbutyrate oils.

13 Claims, No Drawings

METHOD OF MAKING NUTRITIONAL EMULSIONS CONTAINING PROCESS-ENCAPSULATED OILS

CROSS REFERENCE TO RELATED APPLICATIONS

This application is the U.S. national phase entry of PCT/US2011/036761, with an international filing date of 17 May 2011, which claims the benefit of U.S. provisional application Ser. No. 61/345,353, with a filing date of 17 May 2010, the entire disclosures of all which are fully incorporated herein by reference.

The present invention relates to a method of making nutritional emulsions containing process-encapsulated oils in combination with low DE maltodextrins.

BACKGROUND OF THE INVENTION

Nutritional liquids are well known and commercially available for a variety of nutritional or disease specific applications in infants, children and adults. These liquids are often formulated as oil-in-water emulsions comprising proteins, carbohydrates, and fats, and typically also vitamins and minerals.

These nutritional liquids have also been used to deliver variety of nutritional actives such as polyunsaturated fatty acids or fish oils. A growing body of evidence suggests that certain long chain polyunsaturated fatty acids may be beneficial for maintaining overall health, and may be useful in treating a variety of human afflictions, including cardiovascular disease, rheumatoid arthritis, depression, Alzheimer's, ulcers, cancer, hyperactivity, asthma, and similar other diseases or conditions.

Polyunsaturated fatty acids, however, often have or develop over time objectionable flavors, odors, or both, especially when formulated within a nutritional liquid. When exposed to heat and atmospheric levels of oxygen, the unsaturated structure of these polyunsaturated fatty acids reacts to form free radicals. These free radicals can continue to break down the polyunsaturated fatty acids in an auto-oxidative process, which results in the development of fishy or other undesirable flavors and odors and the eventual degradation of the beneficial polyunsaturated fatty acids.

Oxidative stability has become especially challenging when formulating a nutritional liquid containing the relatively high concentrations of polyunsaturated fatty acids often needed to obtain a therapeutic response. Allowing even some oxidation in these products often results in a highly objectionable flavor and aroma, the characteristics of which are often described as fishy, eggy, or otherwise having a rancid flavor or smell, depending upon the particular polyunsaturated fatty acid used in the formulation.

Methods of controlling the undesirable oxidation of polyunsaturated fatty acids in a nutritional product include processing or manufacturing controls to limit conditions such as elevated temperatures, exposure to ultraviolet light, exposure to oxygen and other factors that can promote oxidation. All such methods almost always include the concurrent formulation with one or more anti-oxidant additives such as ascorbic acid or ascorbyl palmitate, tocopherols, beta-carotene, or others. Although these methods are often highly effective in reducing much of the undesirable oxidation that would otherwise occur, they are often not as effective when applied to liquid nutritional compositions that contain the relatively high polyunsaturated fatty acid concentrations often needed to achieve a desired therapeutic effect.

It has now been discovered herein that certain nutritional emulsions can be formulated with little or no detectable off-flavors from high concentrations of polyunsaturated fatty acids. These emulsions are prepared by (A) heating and blending together an emulsifying agent having a melt point above about 25° C. and a non-encapsulated polyunsaturated fatty acid in a weight ratio of at least about 1:15; (B) adding the heated blend to a fat, protein, and carbohydrate mixture comprising a maltodextrin having a Dextrose Equivalent of about 10 or less, in a weight ratio of the maltodextrin to the polyunsaturated fatty acid of at least about 1:2; and (D) homogenizing, and then cooling the combination below the melt point of the emulsifying agent to form a nutritional emulsion comprising from about 0.01% to about 5% by weight of process-encapsulated polyunsaturated fatty acid.

It has also been discovered herein that these methods can be used with most any oil having hydrophobic off-notes, not just polyunsaturated fatty acids, to effectively minimize or eliminate off-notes in the final nutritional product.

SUMMARY OF THE INVENTION

The present invention is therefore directed to a method of making nutritional emulsions, comprising: (A) heating and blending together an emulsifying agent having a melt point above about 25° C. and an oil having hydrophobic off-notes (e.g., polyunsaturated fatty acids) in a weight ratio of at least about 1:15; (B) adding the heated blend to a fat, protein, and carbohydrate mixture comprising a maltodextrin having a Dextrose Equivalent of about 10 or less, in a weight ratio of the maltodextrin to the oil having hydrophobic off-notes of at least about 1:2; and (C) homogenizing, and then cooling the combination below the melt point of the emulsifying agent to form a nutritional emulsion comprising from about 0.01% to about 5% by weight of process-encapsulated oil having hydrophobic off notes.

Nutritional emulsions made in accordance with the method include those comprising fat, protein, and carbohydrate, including from about 0.01% to about 5% by weight of an oil having hydrophobic off-notes (e.g., polyunsaturated fatty acids) that is process-encapsulated in an emulsifying agent having a melt point above about 25° C., and maltodextrin having a DE value about 10 or less, wherein the weight ratio of the emulsifying agent to the process-encapsulated oil is at least about 1:15 and the weight ratio of the maltodextrin to the oil is at least about 1:2.

It has been discovered herein that this particular method is useful in preparing oil-in-water emulsions that effectively mask the flavor of oils having hydrophobic off-notes (e.g., polyunsaturated fatty acids). This is accomplished by process-encapsulating the polyunsaturated fatty acid in selected emulsifying agents, in the manner described herein, and then combining it with a certain maltodextrins.

It has been discovered herein that to effectively mask the hydrophobic off-notes in these emulsions, the process encapsulated oils (encapsulated during processing by the high melting point emulsifier) must be used in combination with selected maltodextrins defined by DE value of about 10 or less.

DETAILED DESCRIPTION OF THE INVENTION

The method of the present invention includes those steps directed to process encapsulation of oils having hydrophobic off-notes, using selected emulsifying agents, and then combining the encapsulated oils with selected maltodextrins.

These and other essential or optional elements or limitations of the methods of the present invention are described in detail hereinafter.

The term "nutritional emulsion" as used herein, unless otherwise specified, refers to oral liquids in the form of oil-in-water emulsions comprising fat, protein, and carbohydrates, which may be formulated as meal replacement products, nutritional supplements, or continuous (or intermittent) enteral feedings.

The terms "polyunsaturated fatty acid" or "PUFA" as used herein, unless otherwise specified, refer to any polyunsaturated fatty acid or source thereof, including short chain (less than about 6 carbon atoms per chain), medium chain (from about 6 to 18 carbon atoms per chain) and long chain (having at least about 20 carbon atoms per chain) fatty acids having two or more carbon:carbon double bonds, including n-3 (omega-3) and n-6 (omega-6) polyunsaturated fatty acids.

The term "process-encapsulated" as used herein refers to the combination of a oil having hydrophobic off-notes and a high melting point emulsifier, wherein the two are combined to form a liquid intermediate during processing but prior to incorporation into the nutritional emulsion, and are added in liquid form to one or more of fat, protein, and carbohydrate intermediate ingredients, to thereafter effectively result in solid encapsulation of the oil having hydrophobic off-notes by the high melting point emulsifier in the finished product.

All percentages, parts and ratios as used herein are by weight of the total composition, unless otherwise specified. All such weights as they pertain to listed ingredients are based on the active level and, therefore, do not include solvents or by-products that may be included in commercially available materials, unless otherwise specified.

All numerical ranges as used herein, whether or not expressly preceded by the term "about", are intended and understood to be preceded by that term, unless otherwise specified.

Any reference to singular characteristics or limitations of the present invention shall include the corresponding plural characteristic or limitation, and vice versa, unless otherwise specified or clearly implied to the contrary by the context in which the reference is made.

Any combination of method or process steps as used herein can be performed in any order, unless otherwise specified or clearly implied to the contrary by the context in which the referenced combination is made.

The method of the present invention, including the nutritional emulsions made in accordance with the method, may also be substantially free of any optional or a selected essential ingredient or feature described herein, provided that the remaining formula still contains all of the required ingredients or features as described herein. In this context, the term "substantially free" means that the selected composition contains less than a functional amount of the optional ingredient, typically less than 0.1% by weight, and also including zero percent by weight, of such optional or selected essential ingredient.

The method of the present invention may comprise, consist of, or consist essentially of the essential elements and limitations of the invention described herein, as well as any additional or optional ingredients, components, or limitations described herein or otherwise useful in a nutritional or pharmaceutical application.

Method of Manufacture

The method of the present invention is directed to making nutritional emulsions. The method comprises the following steps:

(A) heating and blending together an emulsifying agent having a melt point above about 25° C. and an oil having hydrophobic off-notes, in a weight ratio of at least about 1:15; and (B) adding the heated blend to a fat, protein, and carbohydrate mixture comprising a maltodextrin having a Dextrose Equivalent of about 10 or less, in a weight ratio of the maltodextrin to the oil having hydrophobic off-notes of at least about 1:2; and (D) homogenizing and then cooling the combination below the melt point of the emulsifying agent to form a nutritional emulsion comprising from about 0.01% to about 5% by weight of process-encapsulated oil having hydrophobic off-notes.

The method of the present invention may further comprise any known process additions or variations known or otherwise suitable for manufacturing nutritional emulsions.

For example, step (B) of the method can be performed by separately preparing a protein-in-water slurry (majority protein and water), a carbohydrate-mineral slurry (mineral, carbohydrate including maltodextrin), a protein-in-fat slurry (protein, fat soluble vitamins, fat) and then having these slurries combined with the heated blend from of step (A)—the heated blend of oil having hydrophobic off-notes and high melting temperature emulsifier. The resulting blend is then heat processed, homogenized, standardized with any water-soluble vitamins, flavored, and the resulting nutritional emulsion terminally sterilized or aseptically processed and filled.

Low DE Maltodextrin

The maltodextrin for use in the method of the present invention must have a dextrose equivalent (DE) of about 10 or less, including from about 1 to about 5, including from about 2 to about 4, and also including about 3. Suitable maltodextrins are those that are safe for use in oral nutritional products and that have the requisite DE value.

It has been found that only those maltodextrins having the requisite DE value will effectively work along with the process-encapsulated oil to minimize or eliminate hydrophobic off-notes associated the oil. It has also been found that DE 3 maltodextrin is even more effective in minimizing hydrophobic off-notes than either DE 1 or DE 5 maltodextrins.

The concentration of maltodextrin in the resulting nutritional emulsion is selected so that the resulting weight ratio of maltodextrin to polyunsaturated fatty acid (or other oil having hydrophobic off-notes) is at least about 1:2, preferably from about 1:1 to about 20:1, including from about 2:1 to about 10:1, and also including from about 2.5:1 to about 4:1. These maltodextrin concentrations most typically range from about 0.1% to about 20%, including from about 1% to about 10%, and also including from about 2% to about 7%, by weight of the nutritional emulsion.

Maltodextrins are known for use in a variety of foods and other nutritional products. Maltodextrins are partially hydrolyzed starch molecules comprising a series of D-glucose units linked primarily by (alpha)-1,4 bonds. Although maltodextrins, as an ingredient class, have DE values of 20 or less, only those having DE values of about 10 or less are suitable for use herein.

DE values are conventional measurements of the average reducing power of maltodextrin or other polysaccharide as compared to a dextrose standard. DE values are derived from the formula $[DE=100 \div DP]$, where DP is the degree of polymerization of the maltodextrin or other material, i.e., the number of monosaccharide units in the polysaccharide. Glucose (dextrose) has a DE of 100; starch has a DE of approximately or close to zero.

The maltodextrins for use herein may also be characterized, in the alternative, in terms of DP values rather than DE values, wherein the DP value is about 10 or higher, including from 10 to 250, and also including from 40 to 150.

Non-limiting examples of suitable maltodextrins for use herein include STAR-DRI® 1 (DE 1) and STAR-DRI® 5 (DE 5) from AE Staley Mfr. Company, Decatur, Ill., USA; and M-40 (DE 5) from Grain Processing Corporation, Muscatine, Iowa, USA. Other maltodextrins—those having a DE value greater than 10—may be added, but only as optional ingredients in addition to the other required maltodextrin component.

Oil Having Hydrophobic Off-Notes

The method of the present invention includes, as one of the essential steps, the heating and blending together of an emulsifying agent having a melt point above about 25° C. and oil having hydrophobic off-notes, in a weight ratio of at least about 1:15. The oil having hydrophobic off-notes is then encapsulated by the high melting point emulsifying agent during the method, and thereafter remains encapsulated within the finished product.

It should be noted that the oil having hydrophobic off notes is not encapsulated prior to formulation, that it becomes encapsulated only during formulation of the nutritional emulsion.

The term "oils having hydrophobic off-notes" as used herein, unless otherwise specified, means any hydrophobic material that inherently contains off-notes, or otherwise comprises an ingredient that contributes off-notes to the oil. Examples of oils having hydrophobic off-notes include polyunsaturated fatty acids, soy oil, beta-hydroxy-beta-methylbutyrate or oils containing it, and combinations thereof. The oil preferably comprises a polyunsaturated fatty acid as described herein.

The term "off-notes" as used herein refers to any flavor or aroma inherently associated with an oil or material within oil that a formulator would wish to minimize or eliminate when formulated into a nutritional emulsion. These off-notes are minimized or eliminated in nutritional emulsions made in accordance with the methods herein.

The concentration of the oil having hydrophobic off-notes within the nutritional emulsion represents up to about 5%, including from about 0.01% to about 5%, also including from about 0.3% to about 3%, and also including from about 0.5% to about 2.5%, by weight of the nutritional emulsion.

The oil having the hydrophobic off-notes must be process-encapsulated by the high melting temperature emulsifying agent, wherein the oil having the hydrophobic off-notes preferably represents from about 50% to 100%, including from about 60% to about 90%, also including from about 75% to about 85%, by weight of all material so encapsulated (excluding the high-melting point emulsifying agent). In this context, all other fats within the nutritional emulsion are preferably formulated into the nutritional emulsion separate from and external to the process-encapsulated oil/emulsify agent combination. In other words, the high melting temperature emulsifying agent is melted and combined with the oil having the hydrophobic off-notes prior to formulating it into the nutritional emulsion. The encapsulation of the oil is achieved during processing when the blend is heat treated (UHT), homogenized and chilled.

Although the oils having hydrophobic off-notes can be added to the nutritional emulsion in addition to and separate from the process-encapsulated oils having hydrophobic off-notes, the emulsions are preferably free of such additional oils having hydrophobic off-notes. In this context, "substantially free" means that the composition preferably contains less than about 0.1%, more preferably less than about 0.05%, including zero percent, by weight of such additional oils having hydrophobic off-notes, including both pre-encapsulated and non-encapsulated forms.

For polyunsaturated fatty acid embodiments of the present invention, the polyunsaturated fatty acids for use in the nutritional emulsions, made in accordance with the method of the present invention, include any such fatty acid material, or source thereof, that is suitable for use in oral nutritional products, non-limiting examples of which include n-3 polyunsaturated fatty acids, n-6 polyunsaturated fatty acids, and combinations thereof. Suitable sources of polyunsaturated fatty acids include free fatty acids as well as fatty acid esters such as triglycerides, diglycerides, monoglycerides, ethyl esters, and so forth, including various concentrated forms thereof as well as those in structured lipid form.

Non-limiting examples of suitable polyunsaturated fatty acids for use herein include n-3 polyunsaturated fatty acids such as alpha-linolenic acid (ALA, C18:3n-3), stearidonic acid (C18:4n-3), eicosapentaenoic acid (EPA, C20:5n-3), docosapentaenoic acid (C22:5n-3), docosahexaenoic acid (DHA, C22:6n-3), and combinations thereof. Sources of such n-3 fatty acids for use herein include flax seed oil, canola oil, transgenic oils, and fish oil.

Other polyunsaturated fatty acids suitable for use herein include n-6 polyunsaturated fatty acids such as linoleic acid (C18:2n-6), gamma-linolenic acid (GLA, C18:3n-6), eicosadienoic acid (C20:2n-6), arachidonic acid (ARA, C20:4n-6), di-homo-gamma-linolenic acid (DGLA, C20:3n-6), and combinations thereof, sources of which include evening primrose oil, borage oil, black currant seed oil, flaxseed oil, transgenic sources, purified fatty acid sources, and combinations thereof.

High Melting Point Emulsifier

The high melting point emulsifiers for use in the method herein include any emulsifying agent suitable for use in a nutritional product that also has a melt point of at least about 25° C., preferably from about 30° C. to about 75° C., more preferably from about 45° C. to about 70° C.

The selected emulsifier and the oil having hydrophobic off-notes are melted together to form a liquid, and this mixture is added to the rest of the nutritional formulation (e.g. fat-carbohydrate-protein-mineral blend). The resultant blend is then UHT (Ultra High Temperature) heat-treated and homogenized. The homogenization divides the oil having hydrophobic off-notes into very small droplets coated with the high melting temperature emulsifier. When this homogenized blend is cooled to below room temperature, the emulsifier solidifies, thus resulting in encapsulation of the oil having hydrophobic off-notes (also referred to herein as "process-encapsulated oil).

The amount or concentration of the high melting point emulsifier in the nutritional emulsions is selected so that the resulting weight ratio of the emulsifier to the oil having hydrophobic off-notes is at least 1:15, preferably from 1:10 to 1:1, including from 1:9 to 1:2, and also including from 1:5 to 1:2. Such emulsifier concentrations most typically range from about 2% to about 12%, including from about 4 to about 10%, and also including from 5 to 8%, by weight of the total oil in the emulsion. It is understood, however, that even higher concentrations of emulsifier can be used, especially when additional emulsifier is added for purposes other than encapsulation of the oil having hydrophobic off-notes, e.g., for emulsion stability.

Suitable high melting point emulsifying agents include monoglycerides or other monoesters of polyhydric alcohols, including fatty acid esters of glycerol. Non-limiting examples of some suitable high melting point emulsifiers for use herein include GRINDSTED™ ACETEM (acetic acid esters of monoglycerides), GRINDSTED™ CITREM (citric acid esters of monoglycerides); GRINDSTED™ LACTEM (lactic acid esters of monoglycerides); GRINDSTED™ Mono-Di (mono and diglycerides); GRINDSTED™ PGE or PGPR (polyglycerol esters of fatty acids, polyglycerol polyricinoleate); GRINDSTED™ PGMS (propylene glycerol esters of fatty acids); GRINDSTED™ SMS or STS (sorbitan monostearate, sorbitan tristearate); and DIMODAN® distilled monoglycerides; all available from Danisco, Copenhagen, Denmark.

Other suitable high melting point emulsifying agents include MYVEROL® 18-99K, a distilled monoglyceride comprising a blend of about 82% monoacylglycerols (86.6% monoolein, 7.0% monostearin, 3.5% monopalmitin, 0.9% monoarachidin, 2.0% unidentified), available from Kerry Bio-Science, Hoffman Estates, Ill., USA.

Macronutrients

Nutritional emulsions made in accordance with the method of the present invention comprise fat, protein, and carbohydrate macronutrients. Any source of such nutrients known or otherwise suitable for use in an oral nutritional product is also suitable for use herein, provided that such nutrients are compatible with the selected ingredients in the formulation.

Although concentrations or amounts of each macronutrient in the nutritional emulsion may vary depending upon the nutritional needs of the intended user, such concentrations or amounts most typically fall within one of the following embodied ranges.

| Macronutrient | Embodiments | | |
| --- | --- | --- | --- |
| | A | B | C |
| Carbohydrate[1] - % total calories | 10-85 | 20-60 | 40-60 |
| Fat[2] - % total calories | 10-85 | 10-50 | 15-35 |
| Protein - % total calories | 5-80 | 10-30 | 15-25 |
| Carbohydrate[1] g/100 ml | 1-40 | 4-30 | 10-20 |
| Fat[2] g/100 ml | 0.2-30 | 0.5-15 | 1-5 |
| Protein g/100 ml | 0.5-30 | 1-15 | 2-10 |

[1]Includes maltodextrin component
[2]Includes oil having hydrophobic off-notes; may also include emulsifying agent (if a fat)

The nutritional emulsions made in accordance with the method herein comprise a fat source, which includes the oil having hydrophobic off-notes (e.g., polyunsaturated fatty acid) as described herein. The oil having hydrophobic off-notes may represent all or just some of the fat source. Non-limiting examples of fats for use herein include (in addition to oils having hydrophobic off-notes such polyunsaturated fatty acids) coconut oil, fractionated coconut oil, soy oil (without hydrophobic off-notes), corn oil, olive oil, safflower oil, high oleic safflower oil, MCT oil (medium chain triglycerides), sunflower oil, high oleic sunflower oil, palm and palm kernel oils, palm olein, canola oil, marine oils, cottonseed oils, and combinations thereof. The term "fat" as used herein includes both fats and oils, solid or liquid, unless otherwise specified.

The nutritional emulsions made in accordance with the method comprise a carbohydrate source, which includes the maltodextrin component described herein. The maltodextrin may represent all or just some of the carbohydrate source. Non limiting examples of carbohydrates for use herein include additional hydrolyzed or modified starch or corn-starch, glucose polymers, corn syrup, corn syrup solids, rice-derived carbohydrate, glucose, fructose, lactose, high fructose corn syrup, indigestible oligosaccharides (e.g., fructooligosaccharides), honey, sugar alcohols (e.g., maltitol, erythritol, sorbitol), and combinations thereof.

The nutritional emulsions made in accordance with the method comprise a protein source suitable for use in a nutritional emulsion. Proteins or protein sources suitable for use herein include hydrolyzed, partially hydrolyzed or non-hydrolyzed proteins or protein sources, and can be derived from any known or otherwise suitable source such as milk (e.g., casein, whey), animal (e.g., meat, fish), cereal (e.g., rice, corn), vegetable (e.g., soy), or combinations thereof. Non-limiting examples of such proteins include milk protein isolates, casein protein isolates, milk protein concentrate, whole cows milk, partially or completely defatted milk, soy protein isolates, and so forth.

Optional Ingredients

The method of the present inventing may further comprise the addition of other optional components that may modify the physical, chemical, aesthetic or processing characteristics of the nutritional emulsions or serve as pharmaceutical or additional nutritional components when used in the targeted population. Many such optional ingredients are known or otherwise suitable for use in other nutritional products and may also be used in the methods herein, provided that such optional ingredients are safe and effective for oral administration and are compatible with the essential and other ingredients in the selected product form.

Non-limiting examples of such optional ingredients include preservatives, antioxidants, other additional emulsifying agents, buffers, pharmaceutical actives, additional nutrients as described herein, sweeteners including artificial sweeteners (e.g., saccharine, aspartame, acesulfame K, sucralose) colorants, flavors, thickening agents and stabilizers, and so forth.

The methods of the present invention may further comprise the addition of any of a variety of other vitamins or related nutrients, non-limiting examples of which include vitamin A, vitamin D, vitamin E, vitamin K, thiamine, riboflavin, pyridoxine, vitamin $B_{12}$, carotenoids, niacin, folic acid, pantothenic acid, biotin, vitamin C, choline, inositol, salts and derivatives thereof, and combinations thereof.

The methods may further comprise the addition of any of a variety of other additional minerals, non-limiting examples of which include calcium, phosphorus, magnesium, iron, zinc, manganese, copper, sodium, potassium, molybdenum, chromium, chloride, and combinations thereof.

EXAMPLES

The following examples illustrate specific embodiments of the present invention, including nutritional emulsions made in accordance with the methods of the present invention. These examples are given solely for the purpose of illustration and are not to be construed as limitations of the present invention, as many variations thereof are possible without departing from the spirit and scope of the invention.

Each nutritional emulsion described below is prepared by separately formulating a protein-in-water slurry, a carbohydrate and mineral slurry, and an oil fiber slurry. The oil having the hydrophobic off-notes (e.g., fish oils) and emulsifier blend is prepared separately by heating and blending the two together at a temperature sufficient to melt the solid emulsifier, to thus form a heated liquid blend. The formed slurries are then combined to form a single mixture, and thereafter the fish oil and emulsifier blend (as a heated liquid) is added to the single mixture. The resulting combination is then heat processed, homogenized, standardized with any water-soluble vitamins, flavored, and the resulting nutritional emulsion terminally sterilized or aseptically processed and filled and allowed to cool. Each of the resulting composition comprises oil having hydrophobic off-notes, now encapsulated in the solid emulsifier.

Ingredients used in preparation of the exemplified embodiment are listed in the following table. The finished emulsion is orally administered, on a daily basis, to individuals as a dietary source of polyunsaturated fatty acids, in an amount sufficient to provide sole or supplement nutrition to the targeted users. These Individuals fail to detect any off-flavors or odors associated with the fatty acid component, during or within two hours following consumption.

| Nutritional Emulsion (1000 kg) | | | | |
|---|---|---|---|---|
| Ingredient | Amount | Amount | | Amount |
| Protein in water slurry | | | | |
| Water | 430 kg | 430 kg | 430 kg | 5.64 kg |
| Sodium caseinate (92% protein) | 10.8 kg | 10.8 kg | 10.8 kg | 10.8 kg |
| ALANATE ® 166 (92% protein) partially hydrolyzed sodium caseinate, New Zealand Milk Products, Santa Rosa, CA, USA | 5.64 kg | 5.64 kg | 5.64 kg | 5.64 kg |
| Allapro 4900 (84% protein) Milk protein isolate, New Zealand Milk Products | 30.8 kg | 30.8 kg | 30.8 kg | 30.8 kg |
| Carbohydrate and mineral slurry | | | | |
| Water | 194.5 kg | 194.5 kg | 194.5 kg | 194.5 kg |
| STAR-DRI ® DE-1 Maltodextrin, AE Staley Mfr. Company, Decatur, IL, USA | 45.45 kg | — | 45.45 kg | 45.45 kg |
| Maltodextrin DE-5 | — | 45.45 kg | — | — |
| Maltitol syrup (70% solids) | 34.36 kg | 34.36 kg | 34.36 kg | 34.36 kg |
| Fructose crystalline | 28.00 kg | 28.00 kg | 28.00 kg | 28.00 kg |
| MALTRIN ® M-200, corn syrup solids, Grain Processing Corp., Muscatine, IA, USA | 22.55 kg | 22.55 kg | 22.55 kg | 22.55 kg |
| Fructooligosaccharides | 12.73 kg | 12.73 kg | 12.73 kg | 12.73 kg |
| Magnesium phosphate dibasic | 1.10 kg | 1.10 kg | 1.10 kg | 1.10 kg |
| Sodium citrate | 2.40 kg | 2.40 kg | 2.40 kg | 2.40 kg |
| Potassium chloride | 1.20 kg | 1.20 kg | 1.20 kg | 1.20 kg |
| Tricalcium phosphate | 0.899 kg | 0.899 kg | 0.899 kg | 0.899 kg |
| Calcium carbonate | 0.802 kg | 0.802 kg | 0.802 kg | 0.802 kg |
| AVICEL ® (microcrystalline cellulose), FMC Biopolymer, Philadelphia, PA, USA | 0.526 kg | 0.526 kg | 0.526 kg | 0.526 kg |
| Magnesium chloride | 0.802 kg | 0.802 kg | 0.802 kg | 0.802 kg |
| Potassium phosphate dibasic | 0.350 kg | 0.350 kg | 0.350 kg | 0.350 kg |
| Choline chloride | 0.343 kg | 0.343 kg | 0.343 kg | 0.343 kg |
| Trace and ultra trace mineral premix | 0.269 kg | 0.269 kg | 0.269 kg | 0.269 kg |
| Potassium citrate | 0.549 kg | 0.549 kg | 0.549 kg | 0.549 kg |
| Gellan gum | 0.200 kg | 0.200 kg | 0.200 kg | 0.200 kg |
| Guar gum | 3.27 kg | 3.27 kg | 3.27 kg | 3.27 kg |
| Konjac | 5.64 kg | 5.64 kg | 5.64 kg | 5.64 kg |
| Potassium Iodide | 0.002 kg | 0.002 kg | 0.002 kg | 0.002 kg |
| Fish oil/high melting temerature emulsifier | | | | |
| Marine oil (Mochida-Nissui) (50% Omega-3 Sardine Oil) [1] | 8.0 kg | 8.0 kg | — | 16.0 kg |
| MYVEROL ® 18-06 Grindsted Products [2] | 8.0 kg | 8.0 kg | 8.0 kg | 8.0 kg |
| Soy oil | — | — | 8.0 kg | |
| Oil fiber slurry | | | | |
| Diacylglycerol Oil | 17.64 kg | 17.64 kg | 17.64 kg | 17.64 kg |
| Canola Oil | 1.58 kg | 1.58 kg | 1.58 kg | 1.58 kg |
| High Oleic Safflower Oil | 9.41 kg | 9.41 kg | 9.41 kg | 9.41 kg |
| Soy Lecithin | 0.732 kg | 0.732 kg | 0.732 kg | 0.732 kg |
| Vitamin E | 0.072 kg | 0.072 kg | 0.072 kg | 0.072 kg |
| Lutein | 0.050 kg | 0.050 kg | 0.050 kg | 0.050 kg |
| Vitamin A Palmitate (54% in corn oil) | 0.0078 kg | 0.0078 kg | 0.0078 kg | 0.0078 kg |
| Vitamin DEK | 0.047 kg | 0.047 kg | 0.047 kg | 0.047 kg |
| Water soluble vitamin/flavor Solution | | | | |
| Water | 7.55 kg | 7.55 kg | 7.55 kg | 7.55 kg |
| Ascorbic Acid | 0.424 kg | 0.424 kg | 0.424 kg | 0.424 kg |
| Liquid Sucralose (25%) | 0.300 kg | 0.300 kg | 0.300 kg | 0.300 kg |
| Vitamin Premix | 0.071 kg | 0.071 kg | 0.071 kg | 0.071 kg |
| Choline chloride | 0.343 kg | 0.343 kg | 0.343 kg | 0.343 kg |

-continued

| Nutritional Emulsion (1000 kg) | | | | |
|---|---|---|---|---|
| Ingredient | Amount | Amount | | Amount |
| Raspberry flavor | 2.3 kg | 2.3 kg | 2.3 kg | 2.3 kg |
| FD&C Red #3 | 0.003 kg | 0.003 kg | 0.003 kg | 0.003 kg |
| FD&C Blue #1 | .00035 kg | .00035 kg | .00035 kg | .00035 kg |
| Dilution Water | 55 kg | 55 kg | 55 kg | 55 kg |

[1] Provides 3.93 kg polyunsaturated fatty acids, including docosahexaenoic acid
[2] Emulsifying agent - melting point 69-75° C.

What is claimed is:

1. A method of making a nutritional emulsion, said method comprising:
   (A) heating and blending together an emulsifying agent having a melt point above about 25° C. and a non-encapsulated oil having hydrophobic off-notes in a weight ratio of at least about 1:15; and
   (B) adding the heated blend to a fat, protein, and carbohydrate mixture comprising a maltodextrin having a Dextrose Equivalent of about 10 or less, in a weight ratio of the maltodextrin to the oil having hydrophobic off-notes of at least about 1:2; and
   (C) homogenizing, and then cooling the combination below the melt point of the emulsifying agent to form a nutritional emulsion comprising from about 0.01% to about 5% by weight of a process-encapsulated oil having hydrophobic off-notes.

2. A method according to claim 1 wherein the oil having hydrophobic off-notes is selected from the group consisting of polyunsaturated fatty acids, soy oil, beta-hydroxy-beta-methylbutyrate containing oil, and combinations thereof.

3. A method according to claim 1 wherein the oil having hydrophobic off-notes is a polyunsaturated fatty acid.

4. A method according to claim 3 wherein the weight ratio of emulsifying agent to the process-encapsulated polyunsaturated fatty acid is from 1:9 to 1:2 and the weight ratio of maltodextrin to process-encapsulated polyunsaturated fatty acid is from 1:1 to 20:1.

5. A method according to claim 3 wherein the weight ratio of emulsifying agent to the process-encapsulated polyunsaturated fatty acid is from 1:5 to 1:2 and the weight ratio of maltodextrin to process-encapsulated polyunsaturated fatty acid is from 2.5:1 to 4:1.

6. A method according to claim 3 wherein the nutritional emulsion comprises from about 0.3% to about 3% by weight of the process-encapsulated polyunsaturated fatty acid.

7. A method according to claim 3 wherein the nutritional emulsion is substantially free of polyunsaturated fatty acids other than the process-encapsulated polyunsaturated fatty acid.

8. A method according to claim 3 wherein the emulsifying agent has a melt point of from about 45° C. to about 70° C.

9. A method according to claim 3 wherein the emulsifying agent is a monoglyceride.

10. A method according to claim 3 wherein the polyunsaturated fatty acid includes eicosapentaenoic acid, docosahexaenoic acid, or both.

11. A method according to claim 1 wherein the nutritional emulsion comprises from about 0.1 to about 20% of the maltodextrin and the maltodextrin has a DE of from about 1 to about 5.

12. A method according to claim 1 wherein the maltodextrin has a DE value of about 3.

13. A method according to claim 1 wherein the nutritional emulsion comprises, as a percentage of total calories, from about 10% to about 85% carbohydrate, from about 10% to about 85% fat, and from about 5% to about 80% protein.

* * * * *